US010551560B1

(12) United States Patent
Tkaczyk

(10) Patent No.: US 10,551,560 B1
(45) Date of Patent: Feb. 4, 2020

(54) ARRAYS OF TAPERED LIGHT-GUIDES FOR SNAPSHOT SPECTRAL IMAGING

(71) Applicant: Tomasz S. Tkaczyk, Houston, TX (US)

(72) Inventor: Tomasz S. Tkaczyk, Houston, TX (US)

( * ) Notice: Subject to any disclaimer, the term of this patent is extended or adjusted under 35 U.S.C. 154(b) by 454 days.

(21) Appl. No.: 14/926,386

(22) Filed: Oct. 29, 2015

Related U.S. Application Data

(60) Provisional application No. 62/072,588, filed on Oct. 30, 2014.

(51) Int. Cl.
| | |
|---|---|
| *G02B 6/06* | (2006.01) |
| *G02B 6/04* | (2006.01) |
| *G02B 6/08* | (2006.01) |
| *G02B 6/34* | (2006.01) |
| *H04N 5/225* | (2006.01) |

(52) U.S. Cl.
CPC ............... *G02B 6/08* (2013.01); *G02B 6/34* (2013.01); *H04N 5/2254* (2013.01)

(58) Field of Classification Search
CPC .... H04N 5/238; H04N 5/2253; H04N 5/2254; H04N 5/2258; H04N 5/335; G02B 6/4204; G02B 6/32; G02B 6/34; G02B 6/06; G02B 6/08; G02B 6/04
USPC ................. 385/74, 75, 82, 93, 116, 119–121
See application file for complete search history.

(56) References Cited

U.S. PATENT DOCUMENTS

| | | | |
|---|---|---|---|
| 3,786,840 A | 1/1974 | Courtney-Pratt et al. | |
| 4,323,925 A * | 4/1982 | Abell | G01J 1/04 348/340 |
| 5,106,387 A * | 4/1992 | Kittrell | A61B 1/00096 600/477 |
| 5,481,385 A * | 1/1996 | Zimmerman | G02F 1/133524 349/62 |
| 5,754,715 A | 5/1998 | Melling | |
| 5,864,146 A * | 1/1999 | Karellas | A61B 6/06 250/581 |
| 5,864,644 A | 1/1999 | DiGiovanni et al. | |
| 6,016,376 A | 1/2000 | Ghaemi et al. | |
| 6,249,536 B1 * | 6/2001 | Farries | H01S 5/4031 372/108 |
| 6,366,365 B1 * | 4/2002 | Williamson | G02B 6/12002 250/208.4 |
| 6,851,844 B2 | 2/2005 | Guy | |
| 8,174,694 B2 | 5/2012 | Bodkin | |
| 8,233,148 B2 | 7/2012 | Bodkin et al. | |
| 8,654,328 B2 | 2/2014 | Tkaczyk et al. | |
| 9,201,193 B1 * | 12/2015 | Smith | G02B 6/04 |
| 2006/0081770 A1 * | 4/2006 | Buchin | H01J 31/507 250/214 VT |

(Continued)

*Primary Examiner* — Kaveh C Kianni
*Assistant Examiner* — Hung Q Lam
(74) *Attorney, Agent, or Firm* — Antonio R. Durando

(57) ABSTRACT

Arrays of tapered light-guides enable the development of snapshot multi-dimensional imaging systems, such as containing wavelength information in addition to spatial (x,y) image intensity-distribution information. As a result of the tapered guides, the input and output of the array can have the same overall dimension while producing greater total inter-guide free space at the output plane than present at the input plane for the introduction of optical elements, such as dispersers, as needed for particular applications. Individual guides may be tapered at different rates within the array and the array itself may be tapered as a whole.

17 Claims, 4 Drawing Sheets

(56) References Cited

U.S. PATENT DOCUMENTS

2013/0155244 A1\* 6/2013 O'Rourke .............. H04N 7/185
  348/158
2013/0209112 A1\* 8/2013 Witzens ............... G02B 6/2813
  398/214

\* cited by examiner

ARRAYS OF TAPERED LIGHT-GUIDES FOR SNAPSHOT SPECTRAL IMAGING

RELATED APPLICATIONS

This application is based on and claims the priority of U.S. Provisional Application No. 62/072,588, filed Oct. 30, 2014, hereby incorporated by reference in its entirety.

BACKGROUND OF THE INVENTION

Field of the Invention

The invention relates to optical light-guides and, in particular, to bundles of guides such as fibers and hollow reflective channels used in spectral imaging apparatus.

Description of the Prior Art

Optical fibers used in imaging devices are known in various configurations designed for particular applications. U.S. Pat. No. 3,786,840 (Courtney-Pratt et al.), for example, describes woven optical fibers that permit reproducible transformations between input and output fiber arrays. U.S. Pat. No. 6,851,844 (Guy) discloses a woven fiber fabric capable of emitting light in a directed manner. U.S. Pat. No. 8,174,694 (Bodkin), U.S. Pat. No. 8,233,148 (Bodkin) and U.S. Pat. No. 8,654,328 (Tkaczyk et al.) describe imaging systems where lenslet arrays and optical-fiber arrays are used to divide the field of view into multiple channels, thereby allowing dispersion into multiple spectral signatures.

Imaging devices such as described in the Bodkin and Tkaczyk patents are limited in their applications by loss of light and the optical power and space requirements associated with the use of lenslets, pinholes or miniature mirrors. In addition, these devices are complicated and expensive to manufacture. Therefore, a different approach that enables a simple, relatively inexpensive, and compact optical light-guide would be very desirable in the industry. This invention is directed at overcoming such prior-at limitations.

SUMMARY OF THE INVENTION

The invention consists of arrays of tapered light-guides (referred to herein as ATLs) that enable the development of snapshot multi-dimensional imaging systems (incorporating reflective channels, optical fibers, or optical waveguides) in more efficient configurations than presently possible. The novelty lies in the fact that the individual guides are tapered in the direction of light propagation within the array such that the total output space occupied by the light-guides at the output plane of the array is smaller than the total input space occupied by the light-guides at the input plane of the array. As a result, the input and output of the array can retain the same or similar overall dimensions while producing free space between the guides at the output plane for the introduction of optical elements as needed for particular applications. Individual guides may be tapered at different rates within the array and the array itself may be tapered as a whole.

The key array feature is that the information coupled into the array (at the array input plane) by means of the optical system is transformed into an output distribution (at the array output plane) with void spaces between the outputs of the array guide components. That is, the dimension (the cross-section area) of each tapered individual fiber output is changed with respect to the respective input in such a way that the overall size of the fibers and the spacing between fibers at the output of the array can be controlled as required for particular functional needs.

Various other aspects and advantages of the invention will become clear from the description in the specification that follows and from the novel features particularly pointed out in the appended claims. Therefore, while the invention includes the features hereinafter illustrated in the drawings, fully described in the detailed description of the preferred embodiments and particularly pointed out in the claims, it is understood that such drawings and description disclose only some of the various ways in which the invention may be practiced.

DESCRIPTION OF THE PREFERRED EMBODIMENTS

As used in this disclosure, "center distance" is intended to refer to the distance between the cross-section centers of adjacent light-guides. The term "array" is used to refer to the light-guide device propagating light between an input plane and an output plane as well as to the plurality of guides within the array. Though so represented for illustration, an array of light-guides is not necessarily structured in terms of linear rows and columns; rather, any bundle of guides is labeled as an array for the purposes of the invention. With regard to spectrum, the term "separation" and "separation unit" are used to indicate generally all approaches used in the art to identify various wavelengths and characteristics/parameters thereof.

Figure 1:
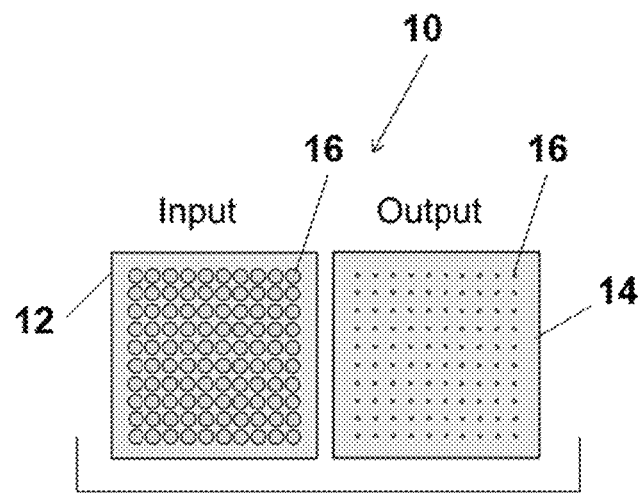
FIG. 1 is an illustration of an ATL according to the invention where the light-guides are uniformly spaced at a constant center distance both at the input and output planes and are all tapered retaining a circular cross-section.

Referring to the figures, wherein like parts are identified throughout by like numerals and symbols, FIG. 1 illustrates the most basic example of an array 10 according to the invention. The input plane 12 and the output plane 14 of the array are shown side by side in separate views for convenience of illustration. In the array 10, the center distance between all light-guides 16 is retained through the length of the array while each guide is tapered equally to produce an output with a different space allocation between light-guides and free space.

Figure 2:
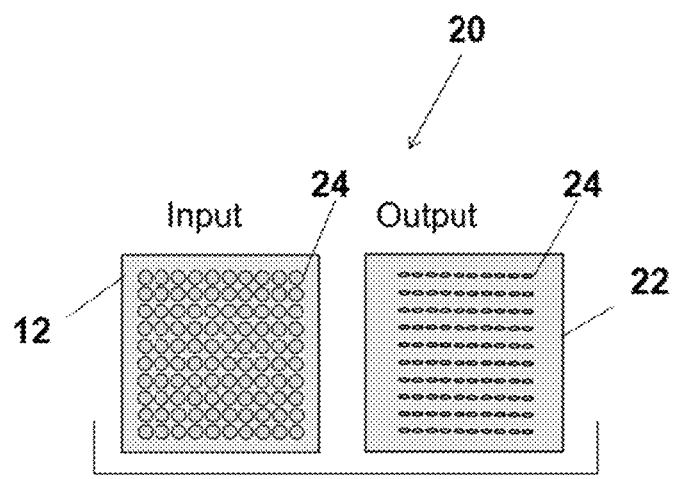
FIG. 2 is an illustration of an ATL where the light-guides are uniformly spaced at a constant center distance both at the input and output planes but are all tapered only in one direction.

FIG. 2 illustrates a different array 20 with the same guide distribution at the input plane 12 but a different space allocation at the output plane 22 produced by a different taper of the guides. In particular, each light-guide 24 is tapered along its vertical cross-section (with reference to the plane of the figure) while retaining its dimension along the horizontal cross-section. This uniform taper produces open space between rows of guides at the output plane 22, but not so between columns of guides, as may be preferable for particular applications.

Figure 3:
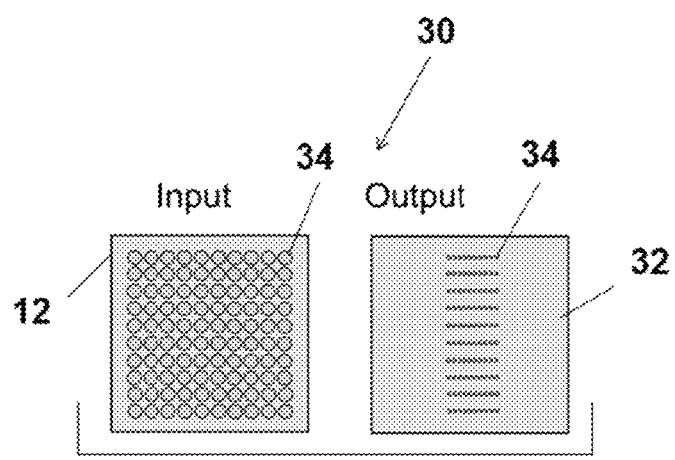
FIG. 3 is an illustration of an ATL where the light-guides are uniformly tapered as in FIG. 1 but the center distance in each row is reduced to taper also each row as a bundle, thereby creating open space only between rows but also laterally on each side of the rows.

As an additional example, FIG. 3 shows an array 30 with the same input plane 12 but an output plane 32 resulting from tapering each guide 34 uniformly as in array 10 of FIG. 1, but also changing the center distance in each row to retain substantially the same spacing of the guides at the input plane 12 throughout the array all the way to the output plane 32. In essence, each row of guides is also tapered as a bundle. As a result, open space is created not only between rows but also laterally on each side of the guides.

To maximize light collection (unless a lenslet array is also used), the dimensions of the light-guides (which are not necessarily the same) should be selected so that they occupy as much as possible of the input-plane area. By making the guide outputs significantly smaller, useful void spaces are created at the output plane according to the invention. As well understood by those skilled in the art, in order to maintain diffraction-limited imaging performance/resolution, the point spread function at the input plane of the array has to be sampled by multiple input light-guides (the Nyquist criteria require at least two samples in the vertical direction and two samples in the horizontal direction). However, a system can also be implemented at lower sampling rates, if diffraction-limited performance is not required.

Figure 4:
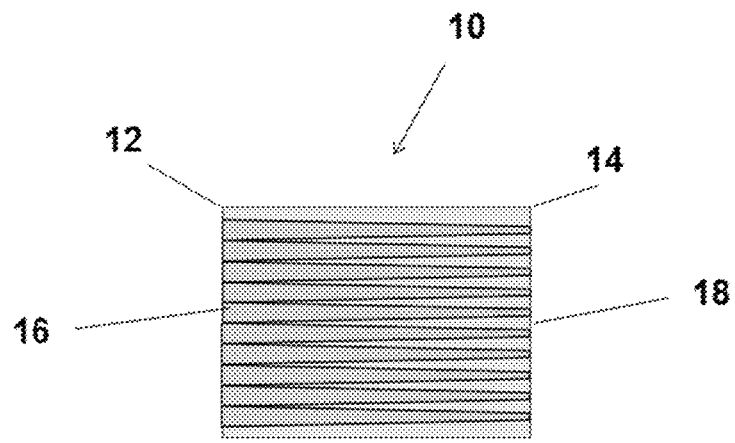
FIG. 4 is a longitudinal cross-section illustration of an ATL corresponding to the invention shown in FIG. 1, showing individual light-guides that are tapered uniformly throughout the array.
Figure 5:
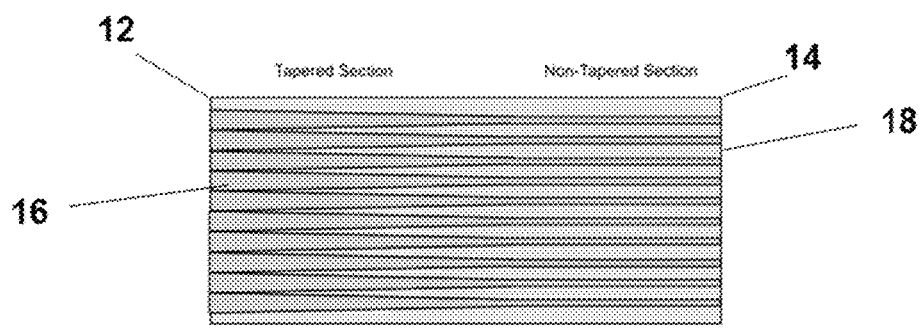
FIG. 5 is a longitudinal cross-section illustration of an ATL corresponding to the invention shown in FIG. 1 at the input and output planes, but showing individual light-guides that are tapered uniformly only along the first half of the array and then retain a constant cross-section in the second half of the array.

FIGS. 4 and 5 are longitudinal cross-section illustrations of ATLs according to the invention having input and output planes as shown in FIG. 1, for example. As illustrated, the light-guides 16 of FIG. 4 are tapered uniformly in the direction of light propagation all the way through the array 10, while the guides of FIG. 5 are similarly tapered in the first half of the array and then retain a constant cross-section in the second half of the array. In either case, the spaces 18 between fibers at the output plane 14 provide an area available for measuring other parameters in addition to the spatial (x,y) image intensity distribution captured at the input plane. For example, the output distribution can be dispersed to achieve a third data dimension, such as wavelength for spectral imaging applications. In such a case it is possible to achieve 3-D information (x,y,λ) encoded in a 2-D distribution. The output can be acquired/recorded with an array image sensor (for example a CCD or a CMOS camera) located in the image plane conjugate of the array output plane (i.e., the image created by means of the optical system). Alternatively, the image sensor may be located in close proximity of the output plane, at the distance necessary to fill the void spaces between the output points with the minimum acceptable overlap. As the input/output transformation is performed using hardware components (channel/fiber array) and recording can be achieved in parallel (using single or multiple image sensors), the data can be obtained instantaneously, without scanning.

Figure 6:
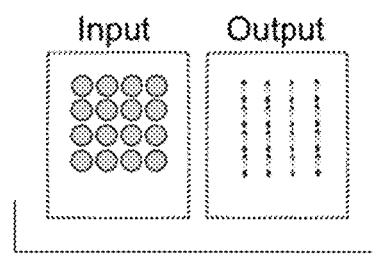
FIG. 6 illustrates a typical 3-D distribution (for example containing also wavelength information) collected by an image sensor when a disperser is used to separate the light in the vertical direction.
Figure 7:
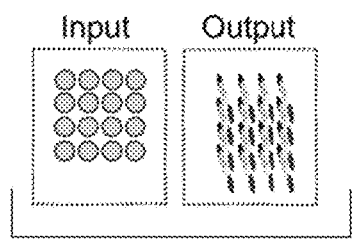
FIG. 7 illustrates a distribution when a disperser is used to separate the light in a tilted direction for better image-sensor-area utilization.

Thus, the ATL of the invention transforms the input into and an output that affords control of the guide spacing and size at the output plane. Because the individual guides can be tapered at a rate different from the tapering of the entire array (if any), the device allows the formation of gaps between individual outputs as needed to provide the space necessary to acquire additional data for snapshot imaging. While the light-guides transfer irradiance from the input to the output of the array, the collection of these additional data requires that an optical component (referred to in the art as a separation unit) be inserted in the output re-imaging path or in the detection path. In the case of spectral imaging, for example, the separation unit is a disperser, such as a prism, a grism, or a diffractive element (diffraction grating, a computer generated hologram, etc.). A typical 3-D distribution obtained on the surface of the image sensor (for example wavelength information) is illustrated schematically in FIG. 6, where the disperser separates the light in the vertical direction, and in FIG. 7, where the light dispersion is tilted for better image-sensor-area utilization.

Other methods of separation such as, for example, radial, two-dimensional, etc., are also possible. As the information about a sample object is distributed across the camera, a datacube can be created using calibration or algorithmic procedures, and x,y,λ, object values can be correlated with pixel coordinates of the image sensor (CCD, CMOS, arrays of photodiodes, arrays of photomultipliers, etc). In spectral imaging, one possible calibration procedure is carried out recording a series of known objects at known wavelengths and creating look-up tables that are then used in creating object datacubes in conventional manner.

The light-guides used in the arrays of the invention can have different structures. For example, they can be made using reflective components in micro-channels (such as metal, reflective material, or coated channels). Reflective guides can be hollow (and thus achromatic) or contain low-dispersion material (air or other gas). However, solid filling materials are also possible. The light-guides can also be made using refractive components like optical fibers or waveguides. The tapering of the light-guides can be linear or curved and the rate of tapering may be different in different directions.

As those skilled in the art would readily understand, for both reflective and refractive light-guides the taper angle and the length of the tapered sections have to be selected so as to obtain a high-efficiency output (high input/output ratio). If too long or too steep over the taper length, reflective guides may start working as retro-reflectors and provide low or no output irradiance. Refractive light-guides need to be shaped so that there is limited cross-talk between the channels due to reflection angles that are outside of the total internal reflection angle range. Cross-talk effects can also lower output signal. Cross-talk effects in refractive waveguides will occur if the angles are too steep. This happens when the light is coupled at larger angles than the light-guides' numerical aperture or when, after few reflections in the guide, the angle becomes more and more perpendicular to the interface due to the taper in the guides.

Figure 8:
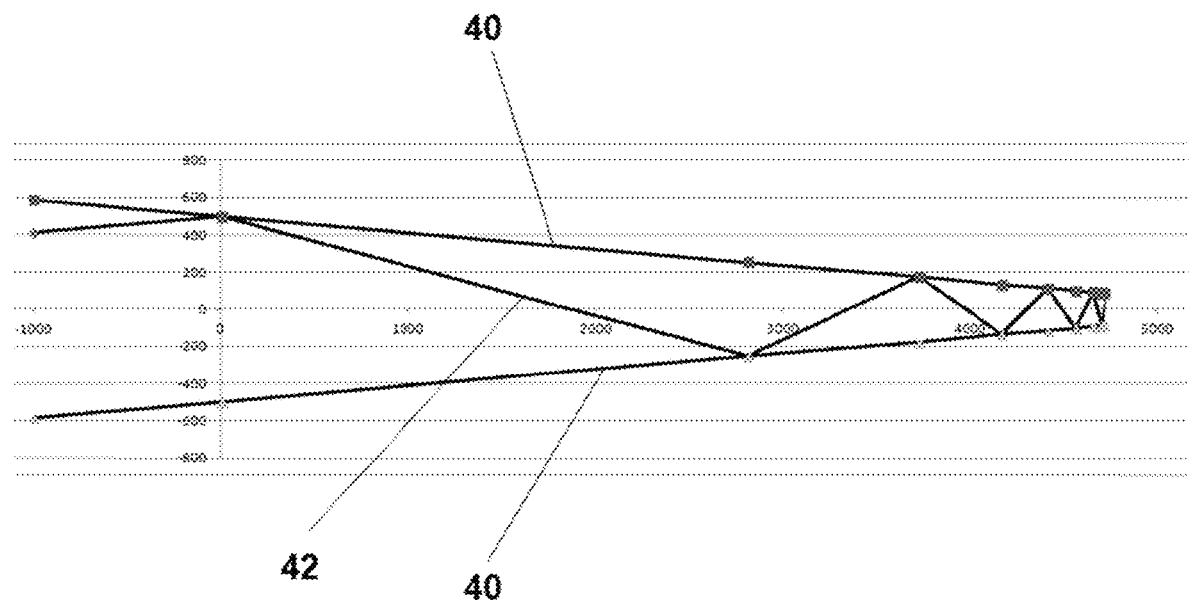
FIG. 8 illustrates the propagation of light in a tapered reflective channel.

An example of propagation in a reflective channel is shown in FIG. 8. As illustrated, if a light-guide 40 is too long at a given taper angle, the light is reflected at steeper angles along the direction of propagation and may not be able to leave the optical guide at the output side. Thus, to enable longer light-guides, the taper angle needs to be smaller. FIG. 8 illustrates in longitudinal cross-section an optical ray 42 within the reflective guide 40 (seen between the top and bottom boundary lines of the guide). Values are in microns to illustrate exemplary dimensions. Ultimately, though, it is anticipated that the dimensions would be significantly smaller to make more compact systems. It is expected that the arrays of the invention will have hundreds or even thousands of guides in each row and column, for a total of tens or hundreds of thousands or even more waveguides.

Figure 9:
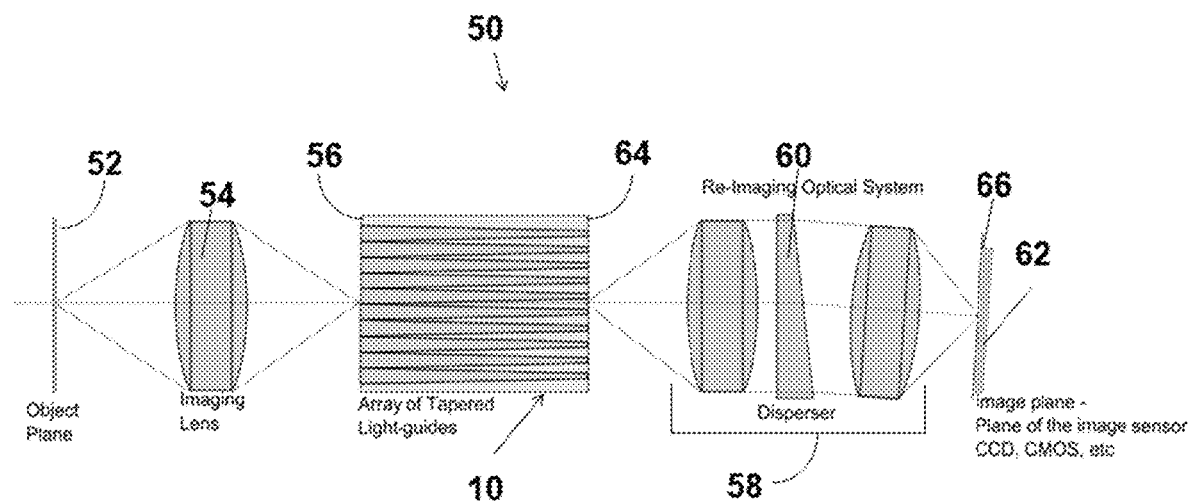
FIG. 9 is a schematic exemplary implementation of a snapshot multi-dimensional imaging apparatus according to the invention where the object is imaged onto the input plane of the ATL by means of an optical system and the output of the ATL is dispersed and also imaged onto the sensor by a re-imaging optical system.

FIG. 9 is an exemplary input-system implementation of a snapshot multi-dimensional imaging apparatus 50 according to the invention where the object placed at an object plane 52 is imaged through an appropriate optical system 54 onto the input plane 56 of an ATL, such as the array 10 of FIG. 1 (shown as an exemplary ATL structure). As a variant (not shown), the object can be imaged onto the input plane of the ATL by the combination of the optical system and an additional waveguide/fiber array(s). Alternatively (also not shown), the input plane of the light-guide array is placed in contact or close proximity to the imaged object.

Figure 10:
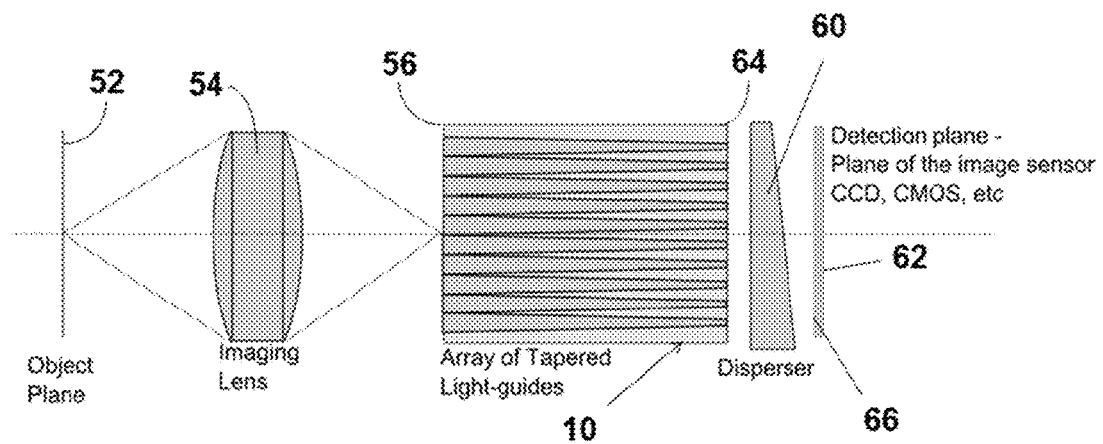
FIG. 10 is another example of ATL implementation where the output plane of the array is in close proximity of the image sensor and a disperser is placed in the optical train between the two.

As shown in FIG. 9, the ATL's output can be imaged onto the image sensor by means of an appropriate optical system 58 that includes a separation unit 60 optically coupled to the wavefront produced at the output of the array. Note that the re-imaging optical system 58 may be tunable (using zoom optics) to change the dimensions of a datacube (for spectral imaging, an x,y,λ datacube). That way the number of values for x or y can be increased/decreased in function of cost/benefit of λ, respectively. The ATL's output may also be imaged onto the image sensor 62 by a combination of the optical system and an additional waveguide/fiber array(s). Alternatively, the output plane 64 of the array of the tapered light-guides can be in close proximity of the image sensor, as shown in the imaging apparatus of FIG. 10. In such case the space between the ATL's output plane 64 and the plane 66 of the image sensor 62 is used to house the separation unit 60 to discriminate the spectral information, for example. Such a component could be a disperser (prism, diffraction grating, grism, etc), for instance. A bandpass filter can be inserted before the input or after the output of the ATL component in order to define the instrument's spectral imaging limit. Finally, a variety of individual or multiple image sensors/detectors, like CCD, CMOS, etc., can be used.

In general the invention can be used in a variety of snapshot multi-dimensional imaging applications. The important utility of the system lies in the variety of spectral imaging applications or measurement/detection applications that use spectral information. Examples of selected applications include, without limitation, the fields of microscopy, medical diagnostics, biological imaging, chemical imaging and detection, remote sensing, surveillance, Raman spectroscopy, forensics, astronomy, optical coherence tomography, material sciences, color classification and recognition, food inspection, topography measurements, optical profiling, thin films, spectro-polarimetry, and interferometry. Similarly, the separation units may be devices to separate and detect spectrum information that in turn is used to measure other physical quantities, such as depth and polarization state. As well understood by one skilled in the art, other optical elements, such as mirrors, beam-splitters, retarders and analyzers, may be inserted in the optical train as needed for the particular application.

Various modifications are possible within the meaning and range of equivalence of the appended claims. For example, it is understood that the array of the invention need not be configured in the form of a matrix, with ordered linear rows and columns, but it can consist of any bundle of guides assembled into a structure having input and output planes common to substantially all guides. The critical feature is the tapering of the guides, so that the total space occupied by the guides at the output plane is materially smaller than at the input plane, with the result that free space is created in the direction of light propagation for the introduction of dispersers, as described.

The invention claimed is:

1. A light-guide device comprising:
a bundle of light-guides in a structure having an input plane and an output plane, said input plane including an input area spaced between the light-guides at the input plane, and said light-guides being tapered along a direction of light propagation within said structure such that a total output space occupied by the light-guides at said output plane is smaller than a total input space occupied by the light-guides at said input plane, thereby defining an output area spaced between the light-guides at the output plane that is greater than said input area spaced between the light-guides at the input plane; and
a disperser optically coupled to said output plane to extract predetermined information from light received at the output plane of the structure;
wherein the disperser is a diffractive element, a prism, or a grism.

2. The device of claim 1, wherein the light-guides are reflective.

3. The device of claim 1, where in the light-guides are refractive.

4. The device of claim 1, wherein the light-guides are tapered uniformly.

5. The device of claim 1, wherein the light-guides are tapered non-uniformly.

6. An imaging system comprising:
a bundle of light-guides in a structure having an input plane and an output plane, said input plane including an input area spaced between the light-guides at the input plane;
an imaging optical system imaging an object onto the input plane of said structure; and
a re-imaging optical system imaging light received at the output plane of said structure onto a detector;
wherein said light-guides are tapered along a direction of light propagation within the structure, such that a total output space occupied by the light-guides at said output plane is smaller than a total input space occupied by the light-guides at said input plane, thereby defining an output area spaced between the light-guides at the output plane that is greater than said input area spaced between the light-guides at the input plane; wherein said re-imaging optical system includes a disperser coupled to said output plane for extracting predetermined information from said light received at the output plane of the structure, and wherein said disperser is a diffractive element, a prism, or a grism.

7. The system of claim 6, wherein the light-guides are reflective.

8. The system of claim 6, where in the light-guides are refractive.

9. The system of claim 6, wherein the light-guides are tapered uniformly.

10. The system of claim 6, wherein the light-guides are tapered non-uniformly.

11. The system of claim 6, wherein said disperser includes a diffraction grating.

12. An imaging system comprising:
   a bundle of light-guides in a structure having an input plane and an output plane, said input plane including an input area spaced between the light-guides at the input plane;
   an imaging optical system imaging an object onto the input plane of said structure;
   a disperser optically coupled to said output plane to extract predetermined information from light received at the output plane of the structure; and
   a detector optically coupled to the separation unit;
   wherein said light-guides are tapered along a direction of light propagation within the structure, such that a total output space occupied by the light-guides at said output plane is smaller than a total input space occupied by the light-guides at said input plane of the structure, thereby defining an output area spaced between the light-guides at the output plane that is greater than said input area spaced between the light-guides at the input plane, and wherein said disperser is a diffractive element, a prism, or a grism.

13. The system of claim 12, wherein the light-guides are reflective.

14. The system of claim 12, where in the light-guides are refractive.

15. The system of claim 12, wherein the light-guides are tapered uniformly.

16. The system of claim 12, wherein the light-guides are tapered non-uniformly.

17. The system of claim 12, wherein said disperser includes a diffraction grating.

* * * * *